United States Patent Office 2,713,763
Patented July 26, 1955

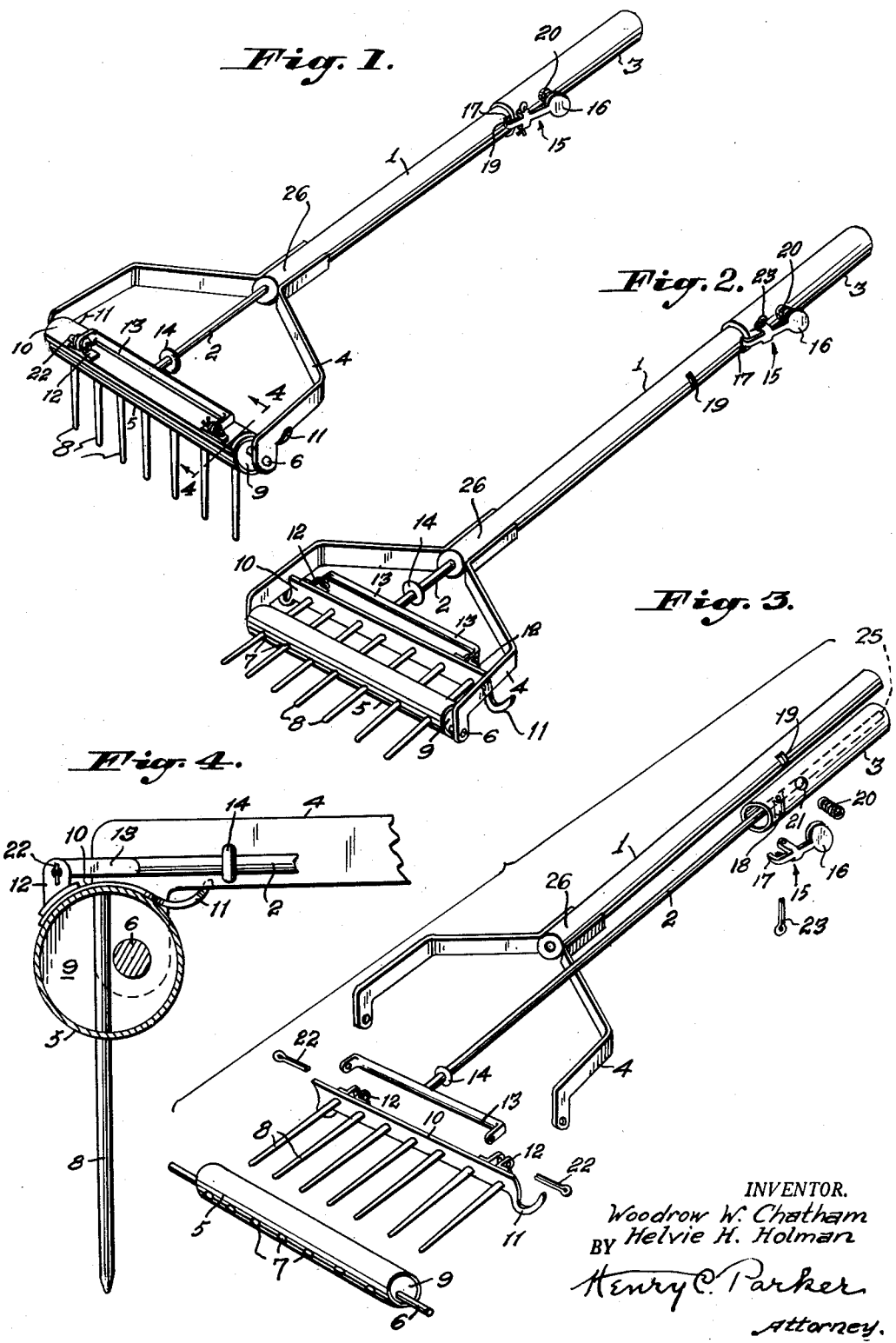

2,713,763

SELF-CLEANING RAKE

Helvie Healey Holman and Woodrow Wilson Chatham, Terre Haute, Ind.

Application February 1, 1954, Serial No. 407,208

10 Claims. (Cl. 56—400.1)

This invention relates to self-cleaning rake; and it comprises a rake suited for the raking of leaves, cut grass and the like comprising in combination a rake handle, a cleaning rod operatively associated with said rake handle and mounted for reciprocation with its axis parallel to the axis of the rake handle, a pair of spaced pivots mounted at the fore end of said cleaning rod with their axis in transverse position with respect to said rod, an elongated tine-holding head pivotally mounted in said pivots, spaced-parallel tines mounted in said tine-holding head, a second pair of spaced pivots mounted at the fore end of said rake handle with their axis in transverse position with respect to said handle, an elongated tine-cleaning means pivotally mounted in said second pair of pivots, said tine-cleaning means being provided with spaced apertures adapted to receive said tines with a sliding fit, the axis about which said tine-holding head pivots being spaced-parallel and offset with respect to the axis about which said tine-cleaning means pivots; said parts being so constructed and arranged that when the cleaning rod is in its foremost position the tine-holding head is abutted against the tine-cleaning means with the tines fully inserted in said apertures and with the tines in raking position, and that as the cleaning rod is pulled towards the rear the tine-holding head and the tine-cleaning means are simultaneously pivoted about their axes in the same direction sufficiently to enable the tines to be pulled by means of the cleaning rod partially through the apertures of the tine-cleaning means thereby to be cleaned; all as more fully hereinafter set forth and as claimed.

Numerous self-cleaning rakes have been previously proposed in the art. The cleaning of rakes is a problem which has been encountered by everyone using a rake ever since rakes where first invented. Most of the prior proposals have been defective either because a cleaning bar was employed which scraped along only one side of the tines of the rake or because the cleaning means was awkward to manipulate or readily put out of order. For these reasons at the present time to the best of our knowledge there is no self-cleaning rake on the market.

We have developed a self-cleaning rake which operates on a novel principle in that a cleaning rod is provided which preferably passes through a cylindrical rake handle, the cleaning rod having at its end a cylindrical handle which fits concentrically over the end of the rake handle with a sliding fit and which can be pulled outwardly with one hand while the rake handle is grasped in the other hand in the cleaning operation. The structure of the rake head is likewise novel since the tines are mounted in a head which is pivotally attached to a yoke mounted at the end of the cleaning rod while a cleaning cylinder is pivotally mounted in a yoke at the end of the rake handle. The tines pass through apertures in the cleaning cylinder and the tine-holding head is arcuate in cross section and fits the cleaning cylinder closely when the tines are in raking position. The axis about which the tine-holding head pivots is spaced-parallel and is offset with respect to the axis about which the tine-cleaning cylinder pivots. Both the tine-holding head and the cleaning cylinder are pivoted during the cleaning stroke of the cleaning rod and the tines pivot to a substantially horizontal position before they are partially withdrawn through the apertures provided in the cleaning cylinder. A stop is provided on the cleaning rod to prevent the tines from being withdrawn entirely from the cleaning cylinder but the withdrawal is to a sufficient distance to produce adequate cleaning of the tines. Locking means are provided to lock the tines in raking position during the raking operation and a thumb rest is provided on the locking means to render this inoperative during the cleaning operation.

Our invention can be explained in greater detail by reference to the accompanying drawing which shows, more or less diagrammatically, a preferred embodiment of our invention. In this showing, Fig. 1 is a perspective view of our rake in its raking position taken from above and from the front, Fig. 2 is a similar view of the rake with the cleaning rod and tines pulled into cleaning position, Fig. 3 is an exploded view showing the separate parts of the rake in unassembled state, while Fig. 4 is an enlarged vertical sectional view taken through the head of the rake along the line 4—4 of Fig. 1.

In the several views like parts are designated by like reference numerals. The rake has a hollow or cylindrical handle 1 which receives an operating or cleaning rod 2 with a sliding fit. The rear or operating end of the operating rod is welded or otherwise secured at 25 inside the closed end of a concentric cylindrical operating handle 3 which fits over the outer end of the rake handle with a sliding fit and helps to guide the operating rod during the cleaning operation. A yoke 4 is mounted at the fore end 26 of the rake handle and a tine-cleaning means usually in the form of a cylinder 5 is rotatably supported in this yoke by means of spindle or shaft 6 which passes through the cleaning cylinder and is journaled at either end in the yoke. The cleaning cylinder is provided with apertures 7 which receive the tines 8 of the rake. The tines preferably pass substantially through the center of the cleaning cylinder as shown in Fig. 4, while the shaft 6 is mounted eccentrically and supported by end plates 9. The tines of the rake are supported in and preferably welded to a tine-holding means or head 10 which has an arcuate cross section, as shown in Fig. 4, and fits partially around the cleaning cylinder when in raking position. The head at each of its ends is provided with a curved extension or arm 11 which locks under the yoke 4 to hold the tines substantially vertical, i. e. in their correct raking position. The tine-holding head is provided at its ends with lugs 12 which provide a pivotal mounting with the yoke 13 which is mounted at the end of cleaning rod 2. Cotter pins 22 can be used as pivot pins. A short distance from the yoke the cleaning rod is provided with a stop 14 which prevents the rod from being drawn too far into the rake handle during the cleaning operation and thus disengaging the tines from the cleaning cylinder.

During the raking operation the cleaning rod is held in fixed position with respect to the rake handle by a locking means which comprises a latch member shown generally at 15 which is provided with a thumb rest 16 at one end and a locking finger 17 at its other end. The latch member is pivotally mounted by means of cotter pin 23 to the operating handle 3 by means of lug 18. When the cleaning rod and handle are in raking position the finger 17 engages in a transverse groove 19 cut in the rake handle thereby preventing relative movement between the rod and the handle. The locking finger is pressed into the groove by means of a compression spring 20 one end of which is mounted in a socket 21 on the operating handle, this spring pressing against the under side of the thumb rest 16.

When the rake is in its operating or raking position, the cleaning handle is pressed forwardly until the finger 17 of the latch member locks into groove 19. This forces the head 10 against the cleaning cylinder and rotates the latter so that the tines swing into vertical position and the locking arm 11 engages with yoke 4 to prevent further forward movement of these parts. The rake can then be used like an ordinary rake. But when the tines become clogged with leaves or other debris it is possible to clean the rake and remove the debris from the tines merely by pressing on the thumb rest of the latch member and pulling the operating handle to the rear with one hand while holding the rake handle firmly with the other hand. As is evident from the described construction this operation pulls the tine-holding head towards the handle causing the cleaning cylinder to rotate until the tines are substantially horizontal. The tines are then pulled through the cleaning cylinder until stop 14 engages the foreward end of the rake handle. By this time the debris has been pushed off the tines which are thereby cleaned and then a short forward push on the operating handle restores the parts to their raking position. The tines are very effectively cleaned since their entire surfaces are scraped as the tines are pulled through the apertures in the cleaning cylinder.

While we have described what we consider to be the most advantageous embodiment of our invention it is evident, of course, that various modifications which fall within the scope of the following claims will be immediately evident to those skilled in this art.

What we claim is:

1. A self-cleaning rake comprising in combination a rake handle, a cleaning rod operatively associated with said rake handle and mounted for reciprocation with its axis parallel to the axis of the rake handle, a pair of spaced pivots mounted at the fore end of said cleaning rod with their axis in transverse position with respect to said rod, an elongated tine-holding head pivotally mounted in said pivots, spaced-parallel tines mounted in said tine-holding head, a second pair of spaced pivots mounted at the fore end of said rake handle with their axis in transverse position with respect to said handle, an elongated tine-cleaning means pivotally mounted in said second pair of pivots, said tine-cleaning means being provided with spaced apertures adapted to receive said tines with a sliding fit, the axis about which said tine-holding head pivots being spaced-parallel and offset with respect to the axis about which said tine-cleaning means pivots; said parts being so constructed and arranged that when the cleaning rod is in its foremost position the tine-holding head is abutted against the tine-cleaning means with the tines fully inserted in said apertures and with the tines in raking position, and that as the cleaning rod is pulled towards the rear the tine-holding head and the tine-cleaning means are simultaneously pivoted about their axes in the same direction sufficiently to enable the tines to be pulled by means of the cleaning rod partially through the apertures of the tine-cleaning means thereby to be cleaned.

2. A self-cleaning rake comprising in combination a cylindrical rake handle having an axial bore, a cleaning rod passing through said bore with a sliding fit, a pair of spaced pivots mounted at the fore end of said rake handle with their axis in transverse position with respect to said handle, an elongated tine-cleaning cylinder pivotally mounted in said pivots, a second pair of spaced pivots mounted at the fore end of said cleaning rod with their axis in transverse position with respect to said rod, an arcuate tine-holding head adapted to fit partially around said tine-cleaning cylinder when the parts are in raking position and pivotally mounted in said second pair of pivots, spaced-parallel tines mounted in said tine-holding head, said tine-cleaning cylinder being provided with spaced apertures adapted to receive said tines with a sliding fit, the axis about which said tine-holding head pivots being spaced-parallel and offset with respect to the axis about which said tine-cleaning cylinder pivots; said parts being so constructed and arranged that when the cleaning rod is in its foremost position the tine-holding head is abutted against the tine-cleaning cylinder with the tines fully inserted in said apertures and with the tines in raking position, and that as the cleaning rod is pulled towards the rear the tine-holding head and the tine-cleaning cylinder are simultaneously pivoted about their axes in the same direction sufficiently to enable the tines to be pulled by means of the cleaning rod partially through the apertures of the tine-cleaning means thereby to be cleaned; a cleaning handle secured to the rear end of said cleaning rod adapted to be pulled when cleaning of the tines is required, and releasable stop means for holding the cleaning rod and tine-holding head in their foremost positions with the tines in raking position.

3. The self-cleaning rake of claim 2 wherein said cleaning handle is a hollow cylinder secured to the rear end of said cleaning rod and fitting concentrically over the rear end of the rake handle with a sliding fit so that the cleaning rod can be operated and cleaning accomplished by reciprocation of said cleaning handle on the rake handle.

4. The self-cleaning rake of claim 1 wherein a stop mounted on said cleaning rod is provided to limit the motion of said rod with respect to the rake handle thereby to prevent the tines from being withdrawn entirely from the apertures of the tine-cleaning means during the cleaning operation.

5. The self-cleaning rake of claim 1 wherein said cleaning rod is secured at its rear end to a cylindrical handle adapted to fit concentrically over the rear end of the rake handle with a sliding fit and to be grasped and pulled by the operator during the cleaning operation.

6. The self-cleaning rake of claim 5 wherein a releasable locking means is mounted on said cylindrical handle and is adapted to lock said handle and said cleaning rod in fixed position with respect to said rake handle with the elements in raking position.

7. The self-cleaning rake of claim 1 wherein said tine-holding head is provided with a locking arm at either end adapted to engage a yoke which pivotally supports the tine-cleaning means in order to hold the tines rigidly during raking.

8. The self-cleaning rake of claim 1 wherein said tine-cleaning means is a cylinder having a shaft passing through its bore, said shaft being journaled in a yoke which supports said tine-cleaning means.

9. The self-cleaning rake of claim 8 wherein said tine-holding means is arcuate in cross section so as to conform in shape to the tine-cleaning means and is adapted partially to fit around said tine-cleaning means during the raking operation.

10. The self-cleaning rake of claim 1 wherein the cleaning rod is provided with a cylindrical handle at its rear end adapted to fit over the rake handle with a sliding fit and a locking means is mounted on said cylindrical handle to lock the parts in raking position, a thumb rest for releasing said locking means being provided which is adapted to be pressed by the thumb of the operator during the cleaning operation.

References Cited in the file of this patent

UNITED STATES PATENTS

| | | |
|---|---|---|
| 1,159,970 | Lund | Nov. 9, 1915 |
| 2,178,288 | Potts | Oct. 31, 1939 |